United States Patent
Gates et al.

[11] 3,878,236
[45] Apr. 15, 1975

[54] SULPHONATES OF HYDROXYBUTYNYL ESTERS OF SUBSTITUTED CARBANALIC ACID

[75] Inventors: Peter Stuart Gates, Cambridge; Geoffrey Tattersall Newbold, Saffron Walden, both of England

[73] Assignee: Fisons Limited, London, England

[22] Filed: June 13, 1972

[21] Appl. No.: 262,335

[30] Foreign Application Priority Data
June 24, 1971 United Kingdom............... 29574/71

[52] U.S. Cl.............................. 260/456 A; 71/103
[51] Int. Cl........................................ C07c 143/02
[58] Field of Search......... 260/456 A, 456 R, 471 C

[56] References Cited
UNITED STATES PATENTS

| | | | |
|---|---|---|---|
| 2,906,614 | 9/1959 | Hopkins........................... | 260/471 C |
| 3,123,463 | 3/1964 | Hopkins et al................... | 260/471 C |
| 3,127,408 | 3/1964 | Hopkins........................... | 260/471 C |
| 3,155,713 | 11/1964 | Hopkins et al................... | 260/471 C |
| 3,226,427 | 12/1965 | Dunbar............................ | 260/471 C |
| 3,253,904 | 5/1966 | Harrison......................... | 260/471 C |
| 3,660,465 | 5/1972 | Baker.............................. | 260/471 C |

OTHER PUBLICATIONS
Riden et al., "Jour. Agri. Food Chem.," Vol. 10, pp. 455–458, 1962.

*Primary Examiner*—Bernard Helfin
*Assistant Examiner*—Norman Morgenstern
*Attorney, Agent, or Firm*—Wenderoth, Lind & Ponack

[57] ABSTRACT

The invention provides new physiologically active compounds having the formula:

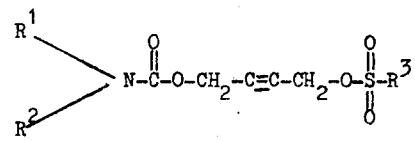

wherein $R^1$ and $R^2$ are the same or different and may be hydrogen or a hydrocarbon group selected from alkyl, alkenyl, alkynyl, aralkyl, cycloalkyl and aryl, each of which hydrocarbon groups may be unsubstituted or substituted, and wherein $R^3$ represents aralkyl or alkyl, each of which may be unsubstituted or substituted. The compounds and compositions containing them may particularly be used as herbicides.

7 Claims, No Drawings

SULPHONATES OF HYDROXYBUTYNYL ESTERS OF SUBSTITUTED CARBANALIC ACID

The present invention relates to certain new substituted butynyl carbamates which have been found to possess important plant physiological activity, particularly herbicidal activity, to their preparation, to compositions containing the same, and to their use as herbicides.

Accordingly the present invention is for the new substituted butynyl carbamates of the general formula I:

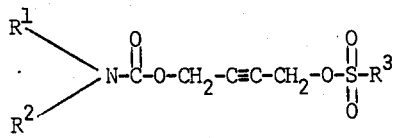

wherein $R^1$ and $R^2$ are the same or different and may be hydrogen or a hydrocarbon group selected from alkyl (for example of 1–6 carbon atoms such as methyl or ethyl), alkenyl (for example of 2–6 carbon atoms such as allyl), alkynyl (for example of 2–6 carbon atoms such as propargyl) aralkyl (for example benzyl), cycloalkyl (for example of 3–6 carbon atoms such as cyclopentyl) and aryl (for example phenyl), each of which hydrocarbon groups may be unsubstituted or substituted, for example by one or more halogen, nitro, alkyl of 1–6 carbon atoms or alkoxy of 1–6 carbon atoms (for example trifluoromethyl, chloroethyl, nitroethyl, chlorophenyl), and wherein $R^3$ represents aralkyl (for example benzyl), or alkyl (for example of 1–6 carbon atoms such as methyl or ethyl), each of which may be unsubstituted or substituted for example by halogen or alkoxy of 1–6 carbon atoms (such as chlorobenzyl, ethoxyethyl methoxypropyl).

The present invention is also for a physiologically active composition and paritcularly a herbicidal composition or plant growth composition which contains as an active component a butynyl carbamate as identified above. The physiologically active composition suitably also contains at least one material selected from the group comprising carriers, wetting agents, inert diluents and solvents.

The present invention is also for the treatment of plants, the soil, land or aquatic areas, or materials, which comprises applying thereon or thereto a butynylcarbamate or a plant physiologically active composition as identified above.

In particular, the present invention is also for a process for the destruction or control of weeds which comprises applying to a locus infested or liable to be infested with weeds a weed-killing amount of a compound or composition as identified above.

The substituted butynyl carbamates according to the present invention generally possess plant physiological activity, and these compounds are particularly useful as herbicides.

The butynyl carbamates of Formula I have been found to be of particular value as selective herbicides for post-emergence use and also are useful for pre-emergence use. With some crops, pre-emergence use is of greater importance. At higher concentrations the compounds may also be used as total weedkillers.

The butynyl carbamates of Formula I and compositions containing them are particularly useful as selective herbicides, for example for the control of weeds such as wild oats and blackgrass in cereal crops.

According to a preferred embodiment the present invention is for the butynyl carbamates of Formula I wherein $R^1$ represents hydrogen, $R^2$ represents a substituted phenyl group (preferably a halogen-substituted phenyl group, for example m-chlorophenyl) and $R^3$ represents an alkyl group of 1–6 carbon atoms. Particularly preferred compounds are 4-methylsulphonyloxy-2-butynyl-m-chlorocarbanilate, 4-ethylsulphonyloxy-2-butynyl-m-chlorocarbanilate, 4-n-propylsulphonyloxy-2-butynyl-m-chlorocarbanilate and 4-n-butylsulphonyloxy-2-butynyl-m-chlorocarbanilate.

The new substituted butynyl carbamates of the invention as identified in formula I are suitably prepared by reacting a 4-hydroxy-2-butynyl carbamate of Formula II:

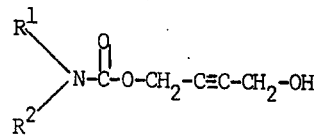

with a sulphonyl halide of the formula $R^3SO_2X$, in which $R^1$, $R^2$ and $R^3$ have the significance indicated above and X is halogen (for example chlorine or bromine).

Alternatively, the new substituted butynyl carbamates may be prepared by reacting a compound of Formula III:

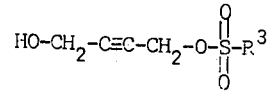

with a compound of Formula IV:

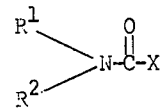

or with phosgene ($COCl_2$) and an amine of Formula V:

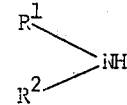

wherein $R^1$, $R^2$ and $R^3$ are as defined above, and X is halogen (for example chlorine or bromine).

The compounds of Formula I in which $R^1$ is hydrogen, may also be prepared by reacting a compound of Formula III with a compound of Formula $R^2$—NCO, wherein $R^2$ is as defined above.

The compounds of Formulae II and III are generally known or may be prepared as follows. Compounds of Formula II may be prepared by the reaction of 1,4-butynediol with a compound of Formula IV, or with phosgene and an amine of Formula V, or with a compound of Formula $R^2$—NCO. Compounds of Formula III may be prepared by the reaction of 1,4-butynediol with a compound of formula R³SO₂X where X is a halogen.

The butynyl carbamates are generally water insoluble and may be formulated in any of the conventional ways for insoluble compounds.

Preferably the butynyl carbamates may be dissolved in a water immiscible solvent, such as for example a high boiling hydrocarbon e.g. a petroleum naphtha, suitably containing dissolved emulsifying agents so as to act as a self-emulsifiable oil on addition to water.

The butynyl carbamates may also be admixed with a wetting agent with or without an inert diluent to form a wettable powder which is soluble or dispersable in water, or may be mixed with the inert diluent to form a solid or powdery product.

Inert diluents with which the butynyl carbamates may be incorporated include solid inert media comprising powdered or divided solid materials, for example, clays, sands, talc, mica, peat, fertilizers and the like, such products either comprising dust or larger particle size materials such as granules.

The wetting agents used may comprise anionic compounds such as for example soaps, fatty sulphate esters such as dodecyl sodium sulphate, octadecyl sodium sulphate and cetyl sodium sulphate, fatty aromatic sulphonates such as alkylbenzene sulphonates or butyl napthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The physiologically active compositions according to the present invention may contain in addition to the butynyl carbamates other physiologically active materials such as herbicides, insecticides, fungicides and molluscicides. It has been found that particular advantages are obtained with mixtures with other herbicides.

Accordingly, a further embodiment of the present invention is for a herbicidal composition which comprises a mixture of the butynyl carbamate of Formula I and a second herbicide.

The second herbicide may be for example a phenoxyaliphatic acid, substituted urea, triazine, phenol, nitrile, bipyridylium compound, substituted benzoic acid, halogenated aliphatic acid, carbamate, thiocarbamate, chloroacetamide, diazine, arsenic compound or other herbicidal compound. In respect of selective herbicidal compositions for post-emergence use, the second herbicide is preferably a substituted phenoxyaliphatic acid; in respect of selective herbicidal compositions for pre-emergence use, the second herbicide is preferably a substituted urea or triazine.

The phenoxyaliphatic acid generally comprises alkyl and/or halogen substituted phenoxyaliphatic acids, and their salts, for example alkali metal, amine and alkanolamine salts, and functional derivatives, for example esters and amides. These compounds may be of activity such that they are recognised as commercial herbicides, or may be of only slight herbicidal activity. Examples of the substituted phenoxyaliphatic acids which may be mentioned include 2,4-dichlorophenoxyacetic acid, 2-methyl-4-chlorophenoxyacetic acid; 2,4,5-trichlorophenoxyacetic acid, gamma-2,4-dichlorophenoxy-butyric acid, gamma-2-methyl-4-chlorophenoxy-butyric acid, alpha-2-methyl-4-chlorophenoxypropionic acid.

The substituted urea generally comprises a tri- or tetra-substituted urea such as N'-parachlorophenyl-N,N-dimethylurea, N-butyl-N'-(3,4-dichlorophenyl)-N-methylurea, N'-parachlorophenyl-O,N,N-trimethylisourea, N'-p-chlorophenyl-N-methoxy-N-methylurea, N,N-dimethyl-N'-phenylurea.

The triazine herbicide generally comprises a compound of the formula:

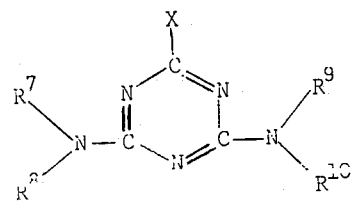

where X is a halogen, OY group or SY group, where Y is an alkyl group, and R⁷, R⁸, R⁹ and R¹⁰ are hydrogen or alkyl, such as 2-chloro-4,6-bisethylamino-1,3,5-triazine or 2-chloro-6-ethylamino-4-isopropylamino-1,3,5-triazine.

The phenol herbicide generally comprises 4,6-dinitro-ocresol or pentachlorophenol. The nitrile herbicide generally comprises 3,5-diiodo-4-hydroxybenzonitrile, 3,5-dibromo-4-hydroxybenzo-nitrile or 2,6-dichlorobenzonitrile. The bipyridylium herbicide generally comprises 1,1'-dimethyl-4,4'-bipyridylium dichloride or 1,1'-ethylene-2,2'-bipyridylium dibromide. The substituted benzoic acid herbicide generally comprises 2,3,6-trichloro-benzoic acid or 2-methoxy-3,6-dichlorobenzoic acid. The halogenated aliphatic acid herbicide generally comprises trichloroacetic acid or 2,2-dichloropropionic acid. The carbamate herbicide generally comprises isopropyl N-(3-chlorophenyl) carbamate or 4-chloro-2-butynyl N-(3-chlorophenyl) carbamate. The thiocarbamate herbicide generally comprises S-ethyl-N,N-dipropylthio-carbamate, S-ethyl N,N-diisobutylthiocarbamate and S-(2,3-dichloroallyl)-N,N-diisopropylthiocarbamate. The chloroacetamide herbicide generally comprises N,N-diallyl-2-chloroacetamide or N-isopropyl-2-chloroacetanilide. The diazine herbicide generally comprises 5-bromo-6-methyl-3-sec-butyluracil, 3-cyclohexyl-5,6-trimethyleneuracil or 1,2-dihydropyridazine-3,6-dione. The arsenic herbicide generally comprises a salt of methane arsonic acid or cacodylic acid. Other herbicides which may be used in such mixtures include aminotriazole,2,3-dichloro-1,4-naphtho-quinone,4-amino-3,5,6-trichloropicolinic acid,2,6-dinitro-N,N-dipropyl-4-trifluoromethylaniline, methyl 3-(metatolylcarbamoyloxyphenyl) carbanilate and S,S,S-tributyl phosphorotrithioate.

A further embodiment of the invention comprises a process for the control of weeds, which comprises the use of a mixture of the butynyl carbamate of Formula I and a second herbicide.

The ratio of the butynyl carbamate to the second herbicide may vary over a wide range according to the particular compounds involved and the intended use. In general the ratio of butynyl carbamate to second herbicide lies in the range 1:0.1 to 1:15.

These mixtures are of particular value in the control of weeds, and may be more effective and economical than the compounds used alone. In some cases synergism is observed.

In the use of the butynyl carbamates as selective herbicides, the rate of application may comprise for example 0.1–5 kg per hectare such as 0.5–2 kg per hectare.

The rate of dilution of the active ingredient in the spray does not appear to be critical and may for example be based on volumes of 10–5000 litres per hectare. The following examples are given to illustrate the present invention, parts and percentages are by weight unless otherwise indicated.

EXAMPLE 1

Methanesulphonyl chloride (7.5 parts) was added portionwise to a solution of 4-hydroxy-2-butynyl m-chlorocarbanilate (14.5 parts) and triethylamine (6.6 parts) in ether (150 parts) with swirling and ice-cooling. The mixture was allowed to stand for three hours, then filtered. The precipitate was treated with a further 150 parts ether and again separated by filtration. The ether solutions were combined and washed twice with water, prior to drying over sodium sulphate. Complete removal of the solvent under vacuum left 4-methylsulphonyloxy-2-butynyl m-chlorocarbanilate as an orange oil. The yield was 13 parts (69%).

| | |
|---|---|
| $C_{12}H_{12}ClNO_5S$ requires: | C, 45.36; H, 3.81; N, 4.41; |
| found: | C, 45.05; H, 4.05; N, 4.35; |

EXAMPLES 2–42

The following compounds of Formula I were prepared by analogous methods to that described in Example 1 from the corresponding 4-hydroxy-2-butynyl substituted carbamate and sulphonyl chloride. The boiling points of those which are liquids were not measured because of instability to heat; however they all gave satisfactory elemental analyses.

| $R^1$ | $R^2$ | $R^3$ | Description | m.p.°C | % yield |
|---|---|---|---|---|---|
| $C_6H_5$ | H | $CH_3$ | white solid | 85–87 | 62 |
| 2—$ClC_6H_4$ | H | $CH_3$ | cloudy liquid | — | 66 |
| 4—$ClC_6H_4$ | H | $CH_3$ | white solid | 89–91 | 70 |
| 3—$BrC_6H_4$ | H | $CH_3$ | brown liquid | — | 89 |
| 4—$IC_6H_4$ | H | $CH_3$ | white solid | 105–6 | 59 |
| 2—$CH_3C_6H_4$ | H | $CH_3$ | brown liquid | — | 55 |
| 3—$CH_3C_6H_4$ | H | $CH_3$ | orange liquid | — | 92 |
| 3—$CH_3OC_6H_4$ | H | $CH_3$ | brown oil | — | 70 |
| 3—$NO_2C_6H_4$ | H | $CH_3$ | white solid | 127–9 | 34 |
| 2,3—$Cl_2C_6H_3$ | H | $CH_3$ | white solid | 82–84 | 36 |
| 2,4—$Cl_2C_6H_3$ | H | $CH_3$ | orange liquid | — | 40 |
| 2,5—$Cl_2C_6H_3$ | H | $CH_3$ | white solid | 47–49 | 55 |
| 3,4—$Cl_2C_6H_3$ | H | $CH_3$ | white solid | 129–131 | 91 |
| 2—$CH_3$—3—$ClC_6H_3$ | H | $CH_3$ | cream solid | 81–83 | 56 |
| 2—$CH_3$—4—$ClC_6H_3$ | H | $CH_3$ | white solid | 75–77 | 59 |
| 3—Cl—4—$CH_3C_6H_3$ | H | $CH_3$ | cream solid | 93–95 | 59 |
| 2—Cl—4—$NO_2C_6H_3$ | H | $CH_3$ | cream solid | 109–112 | 67 |
| 3—$ClC_6H_4$ | H | $C_2H_5$ | orange liquid | — | 85 |
| 3—$CH_3C_6H_4$ | H | $C_2H_5$ | orange liquid | — | 92 |
| 3—$CH_3OC_6H_4$ | H | $C_2H_5$ | brown liquid | — | 65 |
| 2,5—$Cl_2C_6H_3$ | H | $C_2H_5$ | white solid | 70–72 | 54 |
| 3,4—$Cl_2C_6H_3$ | H | $C_2H_5$ | cream solid | 91–93 | 82 |
| 2—$CH_3$—3—$ClC_6H_3$ | H | $C_2H_5$ | cream solid | 35–37 | 79 |
| 2—$ClC_6H_4$ | H | n—$C_3H_7$ | orange liquid | — | 92 |
| 3—$ClC_6H_4$ | H | n—$C_3H_7$ | orange liquid | — | 79 |
| 2—$CH_3C_6H_4$ | H | n—$C_3H_7$ | white solid | 64–66 | 43 |
| 3—$CH_3OC_6H_4$ | H | n—$C_3H_7$ | brown liquid | — | 36 |
| 2,3—$Cl_2H_3$ | H | n—$C_3H_7$ | orange liquid | — | 36 |
| 3,4—$Cl_2C_6H_3$ | H | n—$C_3H_7$ | whitish solid | 48–51 | 82 |
| 3—Cl—4—$CH_3C_6H_3$ | H | n—$C_3H_7$ | brown liquid | — | 73 |
| 3—$ClC_6H_4$ | H | i—$C_3H_7$ | brown liquid | — | 74 |
| 3—$ClC_6H_4$ | H | n—$C_4H_9$ | orange liquid | — | 84 |
| 4—$ClC_6H_4$ | H | n—$C_4H_9$ | brown liquid | — | 88 |
| 3,4—$Cl_2C_6H_3$ | H | n—$C_4H_9$ | cream solid | 56–59 | 77 |
| 3—$ClC_6H_4$ | H | $CH_2C_6H_5$ | orange gum | — | 81 |
| 3—$ClC_6H_4$ | H | $(CH_2)_3Cl$ | brown liquid | — | 95 |
| 1-naphthyl | H | $CH_3$ | brown gum | — | 78 |
| 1-naphthyl | H | $C_2H_5$ | brown oil | — | 90 |
| 1-naphthyl | H | n—$C_4H_9$ | orange oil | — | 80 |
| 2—Cl—4—$NO_2C_6H_3$ | H | n—$C_3H_7$ | cream solid | 83–84 | 64 |
| 4—$CH_3C_6H_4$ | H | $CH_3$ | buff solid | 127–129 | 70 |

EXAMPLES 43-50

Seeds of peas, mustard, linseed, ryegrass, oats and sugarbeet were sown in anodised aluminium pans, 19 cm long × 9 cm wide × 5 cm deep containing John Innes No. 1 potting compost. They were then watered and placed in a controlled environment room (temperature 22°C, relative humidity 65-85%, artificial illumination 14 hours per day at 13000 lux). Fourteen days later the emergent seedlings were sprayed with 50% aqueous acetone solutions of the compounds listed below, which also contained 500 parts per million of a nonylphenol-ethylene oxide condensate as wetting agent. The concentration of active ingredient and volume of application were adjusted so as to be equivalent to a rate of 11.2 kg in 900 litres per hectare.

After seven days further growth in the controlled environment room the plants were visually assessed for any herbicidal response. All differences from untreated controls were scored on an index from 0 to 100 in which 0 represents no effect and 100 represents complete kill, and are tabulated below.

Herbicidal activity

| Compound | Peas | Mustard | Linseed | Ryegrass | Oats | Sugarbeet |
| --- | --- | --- | --- | --- | --- | --- |
| 4-methylsulphonyloxy-2-butynyl m-bromocarbanilate | 15 | 30 | 45 | 40 | 45 | 0 |
| 4-methylsulphonyloxy-2-butynyl m-methylcarbanilate | 15 | 20 | 70 | 30 | 45 | 4 |
| 4-methylsulphonyloxy-2-butynyl 2,4-dichlorocarbanilate | 5 | 30 | 70 | 0 | 30 | 3 |
| 4-ethylsulphonyloxy-2-butynyl m-chlorocarbanilate | 6 | 40 | 70 | 45 | 55 | 10 |
| 4-isopropylsulphonyloxy-2-butynyl m-chlorocarbanilate | 15 | 20 | 45 | 40 | 60 | 5 |
| 4-benzylsulphonyloxy-2-butynyl m-chlorocarbanilate | 0 | 20 | 40 | 30 | 45 | 0 |
| 4-methylsulphonyloxy-2-butynyl 1-naphthylcarbamate | 2 | 5 | 45 | 0 | 0 | 3 |
| 4-(3-chloropropyl-sulphonyloxy)-2-butynyl m-chlorocarbanilate | 5 | 20 | 30 | 30 | 45 | 3 |

EXAMPLES 51-54

Seeds of wheat, barley, wild oats and blackgrass were sown in anodised aluminium pans, 19 cm long × 9 cm wide × 5 cm deep containing John Innes No. 1 potting compost. They were then watered and placed in a controlled environment room (temperature 22°C, relative humidity 65-85%, artificial illumination 14 hours per day at 17000 lux). Fourteen days later the emergent seedlings were sprayed with 50% aqueous acetone solutions of the compounds listed below, which also contained 500 parts per million of a nonylphenol-ethylene oxide condensate as wetting agent. The concentration of active ingredient and volume of application were adjusted so as to be equivalent to a rate of 1.4 kg in 450 litres per hectare.

After 14 days further growth in the controlled environment room the plants were visually assessed for any herbicidal or growth regulatory response. All differences from untreated controls were scored on an index from 0 to 100 in which 0 represents no effect and 100 represents complete kill, and are tabulated below:

Herbicidal Activity

| | Wheat | Barley | Wild oats | Blackgrass |
| --- | --- | --- | --- | --- |
| 4-methylsulphonyloxy-2-butynyl m-chlorocarbanilate | 0 | 0 | 25 | 10 |
| 4-propylsulphonyloxy-2-butynyl m-chlorocarbanilate | 0 | 0 | 25 | 40 |
| 4-ethylsulphonyloxy-2-butynyl m-chlorocarbanilate | 0 | 0 | 45 | 20 |
| 4-butylsulphonyloxy-2-butynyl m-chlorocarbanilate | 0 | 0 | 30 | 45 |

EXAMPLE 55

An emulsifiable oil formulation was prepared form the following components:

| | |
| --- | --- |
| 4-methylsulphonyloxy-2-butynyl m-chlorocarbanilate | – 12.5% w/v |
| calcium dodecylbenzenesulphonate | – 0.9% w/v |
| condensation product of tributylphenol + 11 moles ethylene oxide | – 5.0% w/v |
| condensation product of tributylphenol + 30 moles ethylene oxide | – 3.75% w/v |
| cyclohexanone | – 20.0% v/v |
| petroleum naphtha aromatic fraction, b.p. 225 – 270°C | – to 100% |

EXAMPLE 56

An emulsifiable oil formulation was prepared from the following components:

4-propylsulphonyloxy-2-butynyl m-chlorocarbanilate — 12.5% w/v
calcium dodecylbenzenesulphonate — 0.9% w/v
condensation product of tributylphenol + 11 moles ethylene oxide — 5.0% w/v
condensation product of tributylphenol + 30 moles ethylene oxide — 5.0% w/v
petroleum naphtha aromatic fraction, b.p. 225 – 270°C — to 100%

EXAMPLE 57

The two formulations described in Examples 55 and 56 were diluted and sprayed on to a plot of spring barley densely infested with wild oats. At the time of treatment the majority of the wild oats had from 1 to 3 leaves and the barley was in the early tillering stage. The spray was applied through a logarithmic sprayer at doses from 1.0 to 0.0625 kg/ha of active ingredient. There were two replications of each treatment.

After 23 days, the plots were examined for herbicidal damage to the barley crop and to the wild oat infestation. It was found that both compounds showed herbicidal activity on wild oats causing complete or partial suppression of growth depending on the dose applied. An effect was visible with both compounds at a dose of 0.125 kg/ka; 0.5 kg/ha gave at least 75% suppression of wild oat growth and at 1.0 kg/ha wild oat control was almost complete. Activity on the barley was very much lower and even 1.0 kg/ha caused only a check to growth resulting in a reduction in height. The compounds, therefore, show considerable selectivity between wild oats and barley.

We claim:

1. A compound of the formula

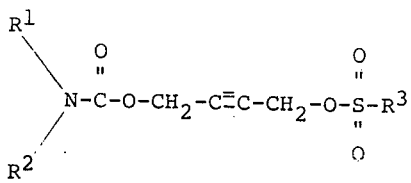

wherein $R^1$ is phenyl, which may be substituted by at least one member selected from the group consisting of a halogen atom, nitro and alkyl of 1–6 carbon atoms; $R^2$ is hydrogen; and $R^3$ is selected from the group consisting of alkyl of 1–6 carbon atoms, phenalkyl in which the alkyl group contains 1–6 carbon atoms, and chloralkyl of 1–6 carbon atoms.

2. A compound according to claim 1 wherein $R^1$ is phenyl substituted by a halogen atom and $R^3$ is alkyl containing 1–6 carbon atoms.

3. A compound according to claim 1 wherein $R^1$ is a phenyl group substituted by halogen and $R^2$ is hydrogen.

4. 4-methylsulphonyloxy-2-butynyl m-chlorocarbanilate.

5. 4-ethylsulphonyloxy-2-butynyl m-chlorocarbanilate.

6. 4-n-propylsulphonyloxy-2-butynyl m-chlorocarbanilate.

7. 4-n-butylsulphonyloxy-2-butynyl m-chlorocarbanilate.

* * * * *